(12) United States Patent
Nakamura

(10) Patent No.: US 10,029,541 B2
(45) Date of Patent: Jul. 24, 2018

(54) LAMINATED GLASS

(71) Applicant: ASAHI GLASS COMPANY, LIMITED, Chiyoda-ku (JP)

(72) Inventor: Atsushi Nakamura, Chiyoda-ku (JP)

(73) Assignee: ASAHI GLASS COMPANY, LIMITED, Chiyoda-ku (JP)

( * ) Notice: Subject to any disclaimer, the term of this patent is extended or adjusted under 35 U.S.C. 154(b) by 0 days.

(21) Appl. No.: 15/274,549

(22) Filed: Sep. 23, 2016

(65) Prior Publication Data
US 2017/0087964 A1 Mar. 30, 2017

(30) Foreign Application Priority Data
Sep. 30, 2015 (JP) .................. 2015-193018

(51) Int. Cl.
| | | |
|---|---|---|
| *G10K 11/168* | (2006.01) | |
| *B60J 1/00* | (2006.01) | |
| *B32B 17/10* | (2006.01) | |
| *G10K 11/172* | (2006.01) | |

(52) U.S. Cl.
CPC ......... *B60J 1/001* (2013.01); *B32B 17/10036* (2013.01); *B32B 17/1077* (2013.01); *B32B 17/10752* (2013.01); *B32B 17/10761* (2013.01); *B32B 17/10788* (2013.01); *G10K 11/168* (2013.01); *G10K 11/172* (2013.01); *B32B 2250/03* (2013.01); *B32B 2307/102* (2013.01); *B32B 2307/546* (2013.01); *B32B 2605/006* (2013.01)

(58) Field of Classification Search
CPC ........ B32B 17/10036; B32B 17/10752; B32B 17/10761; B32B 17/10788; B32B 2250/02; B32B 2307/102; B32B 2307/546; B32B 2605/006; G10K 11/168; G10K 11/172; B60J 1/001
USPC ........................................... 181/286
See application file for complete search history.

(56) References Cited

U.S. PATENT DOCUMENTS

| | | | | |
|---|---|---|---|---|
| 7,886,871 B2* | 2/2011 | Miyai | ............... | B32B 17/10568 |
| | | | | 181/286 |
| 8,474,198 B2* | 7/2013 | Neple | ............... | B32B 17/10009 |
| | | | | 181/286 |
| 2009/0159362 A1 | 6/2009 | Boure et al. | | |

(Continued)

FOREIGN PATENT DOCUMENTS

JP 5089497 12/2012

OTHER PUBLICATIONS

Extended European Search Report dated Feb. 20, 2017 in Patent Application No. 16002082.2.

*Primary Examiner* — Forrest M Phillips
(74) *Attorney, Agent, or Firm* — Oblon, McClelland, Maier & Neustadt, L.L.P.

(57) ABSTRACT

There is provided a laminated glass that has both of a rigidity and a sound insulating property while attaining the weight reduction. The laminated glass comprises a pair of glass plates each having a plate thickness of 0.3 mm to 1.8 mm; and an interlayer film provided between the glass plates and having a storage elastic modulus G' equal to or greater than $2.0 \times 10^6$ Pa at a frequency of 1 Hz and temperature of 20° C., wherein the laminated glass has a loss factor equal to or greater than 0.2 at one or more resonance points at the frequency of 3 to 6 KHz and the temperature of 20° C.

8 Claims, 1 Drawing Sheet

(56) References Cited

U.S. PATENT DOCUMENTS

| | | | |
|---|---|---|---|
| 2010/0307866 A1* | 12/2010 | Zickmantel | G10K 11/168 181/286 |
| 2011/0192678 A1* | 8/2011 | Matsuda | B32B 17/10761 181/286 |
| 2012/0052274 A1* | 3/2012 | Rehfeld | B32B 17/10 428/215 |
| 2013/0316158 A1 | 11/2013 | Rehfeld et al. | |

* cited by examiner

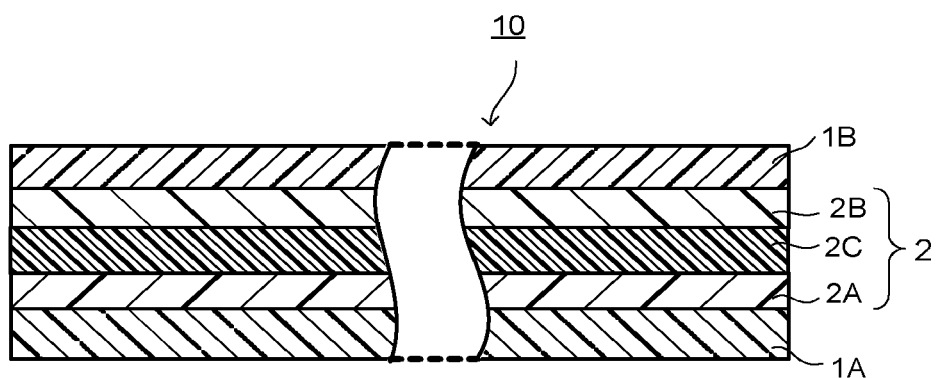

LAMINATED GLASS

CROSS REFERENCE TO RELATED APPLICATION

This application is based upon and claims the benefit of priority from the prior Japanese Patent Application No. 2015-193018, filed on Sep. 30, 2015; the entire contents of which are incorporated herein by reference.

FIELD

The present invention relates to a laminated glass, and, in particular, a laminated glass that has a higher rigidity and a higher sound insulating property while attaining a weight reduction.

BACKGROUND

Recent years, in order to achieve a weight reduction of a vehicle, a weight reduction of various constituent members of the vehicle have been also challenged. Amongst them, weight reduction of a laminated glass used for a window glass has been also challenged. Here, the laminated glass typically has a configuration in which an interlayer film is sandwiched between two glass plates, and is widely used for various purposes such as the vehicle and a building and the like. The above described weight reduction is also a requirement for the laminated glass for the building as well as the laminated glass for the vehicle.

To reduce the thickness of the glass plate is considered to contribute to the weight reduction of the laminated glass. However, it also causes a large problem that the thinner glass plate necessarily entails a reduced strength of the laminated glass. In addition, it is required for the laminated glass to have a sound insulating property. Nevertheless, there is another problem that the reduced thickness of the glass plate necessarily entails a reduced sound insulating property as well.

To cope with those problems, Patent Reference 1 (JP-B No. 5089497) discloses a multi layered sheet for the interlayer film of the laminated glass that is superior in the strength of the laminated glass, in particular, a better breaking strength, an impact resistance, and a penetration resistance when being fabricated into the laminated glass. When the multi layered sheet disclosed in the Patent Reference 1 is used for the interlayer film, the laminated glass obtained has a rigidity and an improved strength even when the thickness of the glass plate is set thinner. However, there is a problem that the sound insulating property is hardly assured. In the meantime, a certain interlayer film has been known in which the sound insulating property has been improved for the use in the vehicle. In this regard, the laminated glass using this type of interlayer film can assure the sound insulating property even when the thickness of the glass plate is set thinner. However, there is another problem of an insufficient rigidity when a so-called sucking out occurs at a time when the laminated glass is used for a side glass or the like, which is a phenomenon in which the glass is sucked out towards the vehicle exterior due to the vehicle exterior becoming at the negative pressure during the high speed running of the vehicle. For this reason, it is demanded to provide a laminated glass that is capable of having the further higher rigidity and higher sound insulating property while attaining the weight reduction.

SUMMARY

The present invention has been made in view of the above mentioned circumstances, and an object thereof is to provide a laminated glass that has both of the rigidity and the sound insulating property while attaining the weight reduction.

According to a laminated glass of the present invention, there is provided a laminated glass including a pair of glass plates each of which has a thickness of 0.3 mm to 1.8 mm; and an interlayer film provided between the glass plates and having a storage elastic modulus G' equal to or greater than $2.0 \times 10^6$ Pa under a condition at a frequency of 1 Hz and a temperature of 20° C., wherein the laminated glass has a loss factor equal to or greater than 0.2 at one or more resonance points under a condition at a frequency of 3 to 6 KHz and a temperature of 20° C.

According to the present invention, the laminated glass can be provided that has both of the rigidity and the sound insulating property while attaining the weight reduction.

BRIEF DESCRIPTION OF THE DRAWINGS

FIG. 1 is a cross sectional view illustrating an example of an embodiment of a laminated glass according to the present invention.

DETAILED DESCRIPTION

Hereinafter, embodiments of the present invention will be described in detail. It should be noted that the present invention is not limited to those embodiments disclosed and various modifications or changes can be made without departing from a gist and a scope of the present invention.

The laminated glass according to the present invention is provided with a pair of glass plates each of which has a thickness of 0.3 mm to 1.8 mm, and an interlayer film provided between the glass plates and having a storage elastic modulus G' equal to or greater than $2.0 \times 10^6$ Pa under a condition at a frequency of 1 Hz and a temperature of 20° C. As for a loss factor to be measured with respect to the laminated glass, the loss factor is equal to or greater than 0.2 at one or more resonance points under a condition at a frequency of 3 to 6 KHz and a temperature of 20° C.

According to the laminated glass of the present invention, each of the pair of the glass plates has a thickness of 0.3 mm to 1.8 mm. The laminated glass according to the present invention is a more lightweight laminated glass compared to the case in which a glass plate of approximately 2 mm, which is used for a conventional laminated glass, is used. Furthermore, the interlayer film of the laminated glass according to the present invention has a function to bond a pair of glass plates to integrate into the laminated glass, the function normally being attained by the interlayer film of the laminated glass. With the storage elastic modulus G' being within the above mentioned range at a frequency of 1 Hz and the temperature of 20° C., it has a sufficient rigidity even when the glass plates with the above mentioned thickness are combined into the laminated glass. Hereinafter throughout the specification, the storage elastic modulus G' at the frequency of 1 Hz and the temperature of 20° C. may be also simply referred to as "storage elastic modulus".

Yet furthermore, in the laminated glass in which the glass plates with the above mentioned plate thickness are combined, the interlayer film according to the present invention is an interlayer film that has a function to allow the laminated glass to have a loss factor within the above mentioned range at one or more resonance points at a frequency of 3 to 6 KHz and the temperature of 20° C. In other words, with the above mentioned interlayer film being provided, the laminated glass according to the present invention is capable of attaining a sufficient sound insulating property even when a pair of glass plates have the above mentioned plate thickness.

According to the laminated glass of the present invention, the interlayer film may be a single layer film, or alternatively a laminated film into which a plurality of layers are laminated, provided that the storage elastic modulus G' is within the above mentioned range and the loss factor property, when the glass plates with the above mentioned thickness are combined into the laminated glass, satisfies the above. When the interlayer film is the laminated film composed of a plurality of layers, preferably the number of layers is 2 to 5, and three layers is in particular more preferable because the above mentioned two properties are more likely to be achieved in a balanced manner.

Hereinafter, embodiments of the laminated glass according to the present invention will now be described with reference to the accompanying drawings in the case, as an example, that the laminated film with three layers is employed as the interlayer film. FIG. 1 is a cross sectional view illustrating an example of an embodiment of the laminated glass according to the present invention.

A laminated glass 10 illustrated in FIG. 1 includes a pair of glass plates 1A and 1B which opposes each other, and an interlayer film 2 arranged such that the interlayer film 2 is sandwiched between the pair of glass plates 1A and 1B. The interlayer film 2 is composed of three layers having a pair of outer layers 2A and 2B, and a core layer 2C arranged such that the core layer 2C is sandwiched between the pair of outer layers 2A and 2B. In the laminated glass 10, the interlayer film 2 is arranged such that the outer layer 2A is located at the glass plate 1A side, and the outer layer 2B is located at the glass plate 1B side. In the laminated glass 10, it is assumed that the pair of glass plates 1A and 1B, and the three layers 2A, 2B and 2C constituting the interlayer film 2 have main surfaces of substantially the same shape and the same dimensions, respectively.

Hereinafter, throughout the specification, "substantially the same shape and same dimensions" is to be understood as having visually same shape and same dimension by a human. Also, even in other cases, "substantially" is to be understood similarly to the above mentioned. Hereinafter, components constituting the laminated glass 10 will be in turn described.

[Glass Plate]

The thickness of each of the pair of glass plates 1A and 1B of the laminated glass 10 is within a range of 0.3 mm to 1.8 mm. With the thicknesses of the glass plates 1A and 1B being equal to or greater than 0.3 mm, it makes it possible to assure the rigidity when the glass plates 1A and 1B are combined with the interlayer film 2, which will be described below, into the laminated glass 10. On the other hand, with the thicknesses of the glass plates 1A and 1B being equal to or less than 1.8 mm, it makes it possible to attain the weight reduction when being fabricated into the laminated glass. The thickness of each of the glass plates 1A and 1B is preferably within the range of 1.0 mm to 1.8 mm, and more preferably within the range of 1.5 mm to 1.8 mm.

The pair of glass plates 1A and 1B may have the same thickness each other, or alternatively may have the different thickness each other. When the glass plates 1A and 1B have the different thickness each other, it is preferable that the thickness of a glass plate to be located inside when the laminated glass 10 is installed onto a window or the like, that is, for example, a glass plate to be located at a side of a vehicle interior in the case of an automotive window glass or a glass plate to be located at a side of a building interior in the case of a building window glass, is smaller than a thickness of a glass plate to be located outside.

For example, in the laminated glass 10, assuming that the glass plate located inside when being used is the glass plate 1A, the thickness of the glass plate 1A is 0.3 mm to 1.8 mm, preferably 1.0 mm to 1.8 mm, and more preferably 1.5 mm to 1.8 mm. Also, the thickness of the glass plate 1A is preferably smaller than the thickness of the glass plate 1B. The difference in the thickness between the glass plate 1A and the glass plate 1B is preferably 0.0 mm to 1.5 mm, and more preferably 0.0 mm to 1.3 mm. Yet also, in this case, the glass plate 1B is assumed to be the glass plate to be located outside, and the thickness of the glass plate 1B is 0.3 mm to 1.8 mm, preferably 1.0 mm to 1.8 mm, and more preferably 1.5 mm to 1.8 mm.

When the glass plate to be located inside, at the time that the laminated glass is used, has a smaller thickness than that of the glass plate to be located outside, it is preferable from a viewpoint of a durability against a flipped stone.

As for a material of the glass plates 1A and 1B used for the laminated glass 10, transparent and inorganic glass or organic glass (resin) can be used. As the inorganic glass, ordinary soda lime glass (also referred to as "soda lime silicate glass"), aluminosilicate glass, borosilicate glass, non-alkali glass, or quartz glass and the like can be used without a particular limitation. Amongst them, the soda lime glass is in particular preferable. Although a glass forming method is also not limited, for example, a float plate glass which has been formed by the float method or the like can be used. Furthermore, it is preferable that a reinforcing process such as an air-cooling and tempering or a chemical strengthening is applied to the glass plates 1A and 1B.

As the organic glass (resin), a polycarbonate resin, a polystyrene resin, an aromatic polyester resin, an acrylic resin, a polyester resin, a polyarylate resin, a polycondensation product of halogenated bisphenol A and ethylene glycol, an acrylic urethane resin, a halogenated aryl group containing acrylic resin and the like can be used. Amongst them, the polycarbonate resin such as the aromatic-based polycarbonate resin or the like, or the acrylic resin such as a polymethyl methacrylate-based acrylic resin or the like is preferable, and the polycarbonate resin is more preferable. Furthermore, amongst the polycarbonate resin, in particular, a bisphenol A-based polycarbonate resin is more preferable. It should be noted that the glass plate may be constituted with two kinds or more of the above mentioned resin being contained.

For the above mentioned glass, a colorless and transparent material without a colored component being added may be used, or alternatively a colored and transparent material colored within a range not impairing an effect of the present invention may be used. Yet furthermore, the glass may be one kind of glass, or alternatively two kinds or more of glass may be combined to be used. For example, the glass may be a laminated substrate into which two or more layers are laminated. Depending on a location at which the laminated glass is applied, as the glass, the inorganic glass is preferable.

The pair of glass plates 1A and 1B used for the laminated glass 10 may be constituted with different kinds of materials each other. However, it is preferable that the pair of glass plates 1A and 1B made of the same material. The shape of the glass plates 1A and 1B may be a flat plate, or alternatively may entirely or partially have a curvature. A coating may be applied onto an exposed surface of the glass plates 1A and 1B, which is exposed to an atmosphere, to impart a water repellent function, a hydrophilic function, an antifogging function or the like. Furthermore, a functional coating normally including a metal layer such as a low emissivity coating, an infrared shielding coating, a conductive coating or the like may be applied onto the opposing surfaces of the glass plate 1A and 1B facing each other.

It should be noted that, when the opposing surfaces of the glass plates 1A and 1B have the above mentioned functional coating, the outer layers 2A and 2B of the interlayer film 2 are configured to contact the functional coating on the opposing surfaces of the glass plates 1A and 1B.

[Interlayer Film]

The interlayer film 2 of the laminated glass 10 is composed of a pair of outer layers 2A and 2B, and a core layer 2C arranged such that the core layer 2C is sandwiched between the outer layers 2A and 2B. The interlayer film 2 is arranged between the glass plates 1A and 1B, and has a function to bond the glass plates 1A and 1B to integrate into the laminated glass 10.

The interlayer film 2 has a storage elastic modulus G' equal to or greater than $2.0 \times 10^6$ Pa at the frequency of 1 Hz and the temperature of 20° C. The storage elastic modulus G' here is an indicator to indicate the rigidity of the interlayer film 2. When the storage elastic modulus G' of the interlayer film 2 is equal to or greater than $2.0 \times 10^6$ Pa, it is possible to assure a sufficiently high rigidity, even if the glass plates 1A and 1B with the above mentioned thickness are combined with the interlayer film 2 into the laminated glass 10. The storage elastic modulus G' of the interlayer film 2 is preferably equal to or greater than $3.0 \times 10^6$ Pa, and more preferably equal to or greater than $4.0 \times 10^6$ Pa.

An upper limit of the storage elastic modulus G' of the interlayer film 2 is not particularly limited. However, in some cases, when the storage elastic modulus G' of the interlayer film 2 becomes higher, then the prescribed sound insulating property, which will be described below, cannot be achieved at the same time when the pair of glass plates 1A and 1B with the above mentioned thickness are combined with the interlayer film 2 into the laminated glass 10. In addition, when the storage elastic modulus G' of the interlayer film 2 is excessively higher, in some cases, the productivity may be lowered such as a specialized equipment being required in a cutting machining or the like. Yet in addition, the interlayer film may become brittle, and penetration resistance thereof may be lowered. Taking those circumstances into consideration, the storage elastic modulus G' of the interlayer film 2 is preferably equal to or less than $1.5 \times 10^8$ Pa, and more preferably equal to or less than $1.3 \times 10^8$ Pa. It should be noted that the storage elastic modulus G' of the interlayer film 2 throughout the specification is a storage elastic modulus that is measured by the shearing method, for example, a dynamic viscoelasticity test measured with a Rheometer MCR301 (brand name) manufactured by Anton Paar GmbH, under a condition at the frequency of 1 Hz and the temperature of 20° C.

Furthermore, the interlayer film 2 is, when the pair of glass plates 1A and 1B is combined with the interlayer film 2 into the laminated glass 10, an interlayer film that imparts a sound insulating property with a loss factor being equal to or greater than 0.2 at one or more resonance points at the frequency of 3 to 6 KHz and the temperature of 20° C. to the laminated glass 10. The sound insulating property of the interlayer film 2 preferably allows the laminated glass to have the loss factor equal to or greater than 0.25 under the above mentioned condition, and more preferably equal to or greater than 0.3.

An upper limit of the loss factor of the laminated glass under the above mentioned conditions, which indicates the sound insulating property of the interlayer film, is not particularly limited. However, in some cases, when the sound insulating property of the interlayer film 2 becomes higher, then the above mentioned prescribed storage elastic modulus G' cannot be satisfied. Taking this point into consideration, the loss factor of the laminated glass under the above mentioned conditions, which indicates the sound insulating property of the interlayer film 2, is preferably up to 0.6 at a maximum.

It should be noted that the sound insulating property of the interlayer film is evaluated based on, throughout the specification, a value measured with, for example, the central exciting method measurement system (MA-5500, DS-2000 (brand name)) manufactured by Ono Sokki Co. Ltd., in which an evaluation target interlayer film is combined with the pair of glass plates with the above mentioned thickness to integrate into a laminated glass, and the loss factor thereof is measured at the frequency of 3 to 6 KHz and the temperature of 20° C.

The interlayer film 2 of the laminated glass 10 is composed of three layers, that is, the core layer 2C, and a pair of outer layers 2A and 2B which sandwiches the core layer 2C. The interlayer film 2 integrating those layers satisfies the prescribed storage elastic modulus G' and the prescribed sound insulating property of the interlayer film of the laminated glass according to the present invention.

The characteristics of the three layers constituting the interlayer film 2 having the above mentioned property is not limited as long as the above mentioned property as the interlayer film 2 is assured. However, it is preferable that the storage elastic modulus G' of the core layer 2C is smaller than the storage elastic modulus G' of the pair of outer layers 2A and 2B. For example, the storage elastic modulus G' of the core layer 2C at the frequency of 1 Hz and the temperature of 20° C. is preferably equal to or greater than $1.0 \times 10^4$ Pa and equal to or less than $1.0 \times 10^7$ Pa, and more preferably equal to or greater than $1.0 \times 10^5$ Pa and equal to or less than $5.0 \times 10^6$ Pa.

Yet furthermore, it is preferable that a glass transition point (hereinafter sometimes referred to as "Tg") of the core layer 2C is lower than the Tg of the outer layers 2A and 2B, and within a range of 0° C. to 20° C. It should be noted that the glass transition point means, throughout the specification, a peak temperature of tan δ of a specimen measured by the dynamic viscoelasticity test in which a temperature dependency of the tan δ of the specimen (loss elastic modulus/storage elastic modulus) is measured under a condition at the frequency of 1 Hz, a dynamic shearing strain of 0.015%, a temperature elevation rate: 3° C./minute, and a measuring temperature range: −40° C. to 80° C.

The tan δ can be measured by, for example, preparing a specimen formed in a disc shape with the thickness d=0.6 mm and the diameter of 12 mm to allow the specimen to undergo a dynamic viscoelasticity measuring machine using a measuring jig: parallel plate (diameter of 12 mm) under the above mentioned conditions. As the dynamic viscoelasticity measuring machine, for example, a rotational type Rheometer MCR 301 (brand name), manufactured by Anton Paar GmbH, can be used.

The storage elastic modulus G's of the outer layers 2A and 2B, while assuring the condition to be larger than the storage elastic modulus G' of the core layer 2C, respectively, are preferably equal to or greater than $5.0 \times 10^6$ Pa and equal to or less than $1.3 \times 10^8$ Pa at the frequency of 1 Hz and the temperature of 20° C., and more preferably equal to or greater than $1.0 \times 10^7$ Pa and equal to or less than $1.3 \times 10^8$ Pa. The storage elastic modulus G' of the pair of outer layers 2A and 2B may be the same each other, or alternatively may be different each other, as long as each of the storage elastic modulus G's of the pair of outer layers 2A and 2B is greater than the storage elastic modulus G' of the core layer 2C. However, it is preferable to be the same each other from a viewpoint to facilitate the resin forming.

The Tgs of the outer layers 2A and 2B are preferably higher than the Tg of the core layer 2C and within a range between 15° C. to 50° C. From a viewpoint to increase the sound insulating property, a value obtained by subtracting the Tg of the core layer 2C from the Tgs of the outer layers 2A and 2B are preferably between 10° C. and 40° C., and more preferably between 20° C. and 35° C.

It should be noted that a relationship between the storage elastic modulus G' of the core layer 2C and the storage elastic modulus G's of the outer layers 2A and 2B are, as a proportional value of the storage elastic modulus G's of the outer layers 2A and 2B with respect to the storage elastic modulus G' of the core layer 2C, preferably 10 to 10000, and more preferably 100 to 3000. By setting the above mentioned relationship between the storage elastic modulus G' of the core layer 2C and the storage elastic modulus G's of the outer layers 2A and 2B, it makes it easier to regulate the storage elastic modulus G' and the sound insulating property of the interlayer film 2 within the above mentioned prescribed range.

The sound insulating property of the interlayer film 2 is regulated with the storage elastic modulus G' and the thickness of each layer of the outer layers 2A and 2B and the core layer 2C. The thickness of the interlayer film 2 is, similarly to an interlayer film normally used for the laminated glass or the like, preferably 0.1 to 1.6 mm, and more preferably 0.5 to 1.2 mm. When the thickness of the interlayer film 2 is less than 0.1 mm, then, in some cases, the strength becomes insufficient. Also, when a glass mismatch is larger, a delamination is more likely to occur. On the other hand, when the thickness of the interlayer film 2 is greater than 1.6 mm, then, in some cases, a phenomenon in which the pair of glass plates 1A and 1B sandwiching the interlayer film 2 are displaced each other, so-called plate displacement phenomenon, occurs during a compression bonding process when fabricating the laminated glass 10, which will be described below, or during an endurance test (an actual exposure test or a high temperature test).

On the other hand, the layer thickness of the core layer 2C is, depending on the storage elastic modulus G' of the core layer 2C or the layer thickness and the storage elastic modulus G' of the outer layers 2A and 2B to be combined with the core layer 2C, preferably 0.05 mm to 0.30 mm, and more preferably 0.07 mm to 0.27 mm. As such, the layer thicknesses of the outer layers 2A and 2B are, depending on the storage elastic modulus Gs' of the outer layers 2A and 2B or the layer thickness and the storage elastic modulus G' of the core layer 2C to be combined with the outer layers, preferably 0.1 mm to 0.7 mm, and more preferably 0.2 mm to 0.5 mm, respectively.

A relationship between the layer thickness of the core layer 2C and the layer thicknesses of the outer layers 2A and 2B is, preferably, as a total thickness of three layers, within a range that is assumed to be preferable as the film thickness of the above mentioned interlayer film 2. Furthermore, the layer thickness of the core layer 2C is preferably smaller than the layer thicknesses of the outer layers 2A and 2B. The layer thicknesses of the outer layers 2A and 2B are preferably within a range one to five times of the layer thickness of the core layer 2C, respectively.

The layer thicknesses of the outer layers 2A and 2B may be the same or alternatively different each other. For example, assuming that, in the laminated glass 10, a glass plate located inside when being used is the glass plate 1A, the outer layer 2A becomes an outer layer that is located inside. In this case, the layer thickness of the outer layer 2A at an inner side may be smaller than the layer thickness of the outer layer 2B at an outer side. The layer thickness of the outer layer 2A is preferably within a range 0.3 to 1.0 times of the layer thickness of the outer layer 2B.

The core layer 2C, the outer layers 2A and 2B are respectively constituted from a thermoplastic resin, which is a main material constituting the interlayer film normally used for the laminated glass, by appropriately selecting a resin such that the above mentioned preferable storage elastic modulus G' can be obtained for each of the layers. As long as the above mentioned preferable storage elastic modulus G' can be regulated, a kind of the thermoplastic resin to be used is not particularly limited.

For the above kind of thermoplastic resin, in particular, a thermoplastic resin includes a polyvinyl acetal resin such as a polyvinyl butyral resin (PVB) or the like, a polyvinyl chloride resin (PVC), a saturated polyester resin, a polyurethane resin, an ethylene-vinyl acetate copolymer resin (EVA), an ethylene-ethyl acrylate copolymer resin, a cyclo olefin polymer (COP) and the like. Those kinds of thermoplastic resin can be regulated to the above mentioned preferable storage elastic modulus G' by, for example, regulating an amount of a plasticizing agent or the like. The thermoplastic resin can be used alone, or alternatively two kinds or more may be used together.

Furthermore, the thermoplastic resin is selected, in addition to the condition of the storage elastic modulus G', depending on an intended use application of the laminated glass, by taking a balance of various properties into account, the properties including a transparency, a weather resistance, an adhesiveness, a penetration resistance, an absorbability of impact energy, a moisture resistance, a thermal insulating property and the like. From those perspectives, PVB, EVA, the polyurethane resin or the like is preferable as the thermoplastic resin constituting the core layer 2C. Also, for the outer layers 2A and 2B, PVB, EVA, the polyurethane resin or the like is preferable, respectively.

For fabricating the core layer 2C, the outer layers 2A and 2B, the thermoplastic resin containing composition is used which contains those thermoplastic resin as the main material. The thermoplastic resin containing composition may include, depending on various intended purposes and within a range not impairing the effect of the present invention, for example, one kind or two kinds or more of various additives including an infrared absorption agent, an ultraviolet absorption agent, a fluorescent, an adhesiveness regulator, a coupling agent, a surfactant agent, an antioxidant, a heat stabilizer, a light stabilizer, a dehydration agent, a de-foaming agent, an antistatic agent, a flame retardant and the like. Those additives are entirely and uniformly contained in the core layer 2C and the outer layers 2A and 2B.

It should be noted that, in the case of the inclusion of an additive imparting an additional function to the core layer 2C and the outer layers 2A and 2B, such as the infrared absorption agent, the ultraviolet absorption agent, the fluorescent or the like amongst the above mentioned additives, out of three layers, any one the three layers may solely contain such additive, or alternatively two layers or more may contain such additive. In the case of two layers or more containing the additive, the same kind of additive may be contained in the same amount or the different amount each other, or alternatively different additives may be contained, respectively.

The interlayer film 2 is fabricated by, for example, film forming the respectively appropriate thermoplastic resin containing compositions in a sheet shape to prepare the core layer 2C and the outer layers 2A and 2B, and allowing the core layer 2C to be sandwiched between the obtained outer layers 2A and 2B to be heated and pressurized. Conditions of the heating and pressurization is selected as appropriate depending on the kind of the thermoplastic resin.

[Laminated Glass]

The laminated glass 10 includes a pair of glass plates 1A and 1B with the above mentioned predetermined thickness, and an interlayer film 2 arranged such that the interlayer film 2 is sandwiched between the pair of glass plates 1A and 1B and having the above mentioned characteristics. With this configuration, the laminated glass 10 is a laminated glass that has both of the rigidity and the sound insulating property together while attaining the weight reduction.

The laminated glass according to the present invention has, as described above, the loss factor equal to or greater than 0.2 at one or more resonance points at the frequency of 3 to 6 KHz and the temperature of 20° C. This characteristic of the laminated glass highly depends on the sound insulating property of the interlayer film, as described above. The laminated glass according to the present invention has, with the characteristics being provided, a sufficient sound insulating property even when the pair of glass plates have the above mentioned thickness.

The loss factor at the resonance point at the temperature of 20° C. and within the range of the frequency of 3 to 6 KHz can be measured by the similar method to that already described in connection to the sound insulating property of the interlayer film. It should be noted that, in the laminated glass according to the present invention, the loss factor at one or more resonance points at the frequency of 3 to 6 KHz and the temperature of 20° C. is preferably equal to or greater than 0.25, and more preferably equal to or greater than 0.3. Also, the loss factor of the laminated glass according to the present invention at the resonance point measured at the frequency of 3 to 6 KHz and the temperature of 20° C. is preferably up to 0.6 at a maximum.

Furthermore, the laminated glass according to the present invention preferably has a three point bend rigidity equal to or greater than 100 N/mm. The three point bend rigidity is the rigidity obtained by the three point bend test, and can be measured by, for example, a compression tensile testing machine. The three point bend rigidity is, in particular, preferably equal to or greater than 120 N/mm. When the three point bend rigidity is equal to or greater than 100 N/mm, then it becomes a rigidity at a level not preventing the glass from opening and closing at a time of high speed running of a vehicle, which is preferable.

The laminated glass according to the present invention preferably also has a sound transmission loss equal to or greater than 25 dB in a coincidence region measured at the temperature of 20° C. in compliance with SAE J1400, and more preferably equal to or greater than 30 dB. When the sound transmission loss of the laminated glass is equal to or greater than 25 dB, then it can be evaluated to have a superior sound insulating property.

(Another Layer)

The laminated glass according to the embodiments may have a functional film between the pair of the glass plates as another layer within a range not impairing the effect of the present invention. When the functional film is provided, for example, it is preferable to constitute the interlayer film with a plurality of layers and to allow the functional film to be sandwiched between the multiple layers constituting the interlayer film.

As the functional film, for example, an infrared shielding film or the like can be used. In the case of the infrared shielding film, in particular, a certain infrared shielding film can be used in which a conventionally known infrared reflective film such as a dielectric multi layered film, a liquid crystal orientation film, an infrared reflective material containing coating film, a single layered or multi layered infrared reflective film which includes a metal film or the like, with the film thickness of approximately 100 to 500 nm, is formed on a supporting film such as a PET film or the like with the thickness of approximately 25 to 200 μm. Further, as the infrared shielding film, a dielectric multi layered film or the like having a total film thickness of approximately 25 to 200 μm into which resin films with different refractive indexes are laminated can be used.

The laminated glass according to the embodiments, may include, as another layer, a black ceramic layer at a whole or part of peripheral portion thereof in a band shape, in order to conceal, for example, a mounting portion of the laminated glass to a frame body or the like, or a wiring conductor or the like. The width of the black ceramic layer is selected as appropriate depending on an intended use application of the laminated glass. For example, in the case that the laminated glass is a roof glass used for a ceiling portion of a vehicle, the black ceramic layer is normally formed in a frame shape with the width of approximately 10 to 100 mm. On the other hand, in the case that the laminated glass is used for a side glass of the vehicle, the black ceramic layer may be normally formed in a band shape with the width of approximately 30 to 200 mm.

The black ceramic layer can be formed in the above mentioned shape by a usual way on the main surface at a side of atmosphere or a side of the interlayer film of either one of the pair of glass plates of the laminated glass. A particular location on which the black ceramic layer is formed is selected as appropriate depending on an intended use application.

It should be noted that "black" of the black ceramic layer does not mean black defined by, for example, the three attributes of color or the like, and means to include a range that is recognizable to be black in which a visible light ray is regulated not to be transmissive at least to the extent that a portion required to be concealed can be concealed. In this regard, in the black ceramic layer, the black color may have a gradation or shading in black as appropriate and a color tone thereof may somewhat differ from a black color defined by the three attributes of color within a range that can achieve the above mentioned function. From a similar viewpoint, the black ceramic layer may be configured such that the whole layer constitutes a continuous integrated film, or alternatively may be configured with a dotted pattern or the like in which a light transmission ratio of the visible light can be easily regulated by setting a shape or an arrangement or the like, depending on a location at which the black ceramic layer is arranged.

[Fabrication of Laminated Glass]

The laminated glass according to the embodiments of the present invention can be fabricated by a generally used known technique. In particular, for the laminated glass 10, the core layer 2C is caused to be sandwiched between the outer layers 2A and 2B as described above to fabricate the interlayer film 2, and the interlayer film 2 is inserted between the pair of glass plates 1A and 1B to prepare a laminated glass precursor that is a laminated glass before the compression bonding in which the glass plate 1A, the interlayer film 2 (i.e., the outer layer 2A/the core layer 2C/the outer layer 2B), and the glass plate 1B is in turn laminated. In case of another layer being provided, also, the glass plates and respective layers are laminated in a similar laminating order to the similarly obtained laminated glass to prepare the laminated glass precursor.

Subsequently, the laminated glass precursor is put into a vacuum bag such as a rubber bag, the vacuum bag is connected to an exhaust system, and bonded at the temperature of approximately 70 to 110° C. while sucking under the reduced pressure (deaerating) such that a pressure inside the vacuum bag becomes a pressure reduction degree of approximately −65 to −100 kPa (absolute pressure) so that the laminated glass according to the embodiments can be obtained. In addition, the laminated glass having further superior durability can be obtained by performing a compression bonding process that applies the heat and pressure under a condition of, for example, 100 to 140° C. and the pressure of 0.6 to 1.3 MPa.

The intended use application of the laminated glass according to the present invention is not particularly limited. Although the laminated glass according to the present invention can be used for a laminated glass for building or a laminated glass for vehicle or the like, the more significant effect can be attained when being used for the laminated glass for the vehicle. Furthermore, amongst laminated glass for the vehicle, it is preferable to be used as a side glass, a roof glass or a rear glass, and more preferable to be used as the side glass. The side glass for the vehicle is required to have the rigidity at a time of sucking out and a higher sound insulating property when the window is closed as well as weight reduction. In this regard, the laminated glass according to the present invention is a laminated glass having a function to satisfy all of those properties.

It should be noted that, when the laminated glass according to the present invention is used for the vehicle, the light transmission ratio of the visible light measured in compliance with JIS R3212 (1998) is preferably equal to or greater than 70%, and more preferably equal to or greater than 74%. In this case, the laminated glass according to the present invention preferably has Tts (Total solar energy transmitted through a glazing), which is measured in compliance with ISO 13837-2008, equal to or less than 66%, and more preferably has the Tts equal to or less than 60%.

EXAMPLES

In the following description, concrete examples of the present invention will be described in more detail. The present invention is however neither limited to embodiments nor examples which will be described below. Examples 1 to 6 correspond to concrete experimental examples, and Examples 7 to 10 correspond to comparative experimental examples.

[Fabrication or Preparation of Interlayer Film]

Interlayer films 1 to 6 (for experimental examples) and interlayer films cf1 to cf4 (for comparative experimental examples), which are used for the Experimental Examples or Comparative Experimental Examples of the present invention and shown in Table 1, were prepared or fabricated and then evaluated. It should be noted that the interlayer film has, with respect to all of the interlayer films 1 to 6 and the interlayer film cf1, a three layer structure composed of the core layer 2C and the outer layers 2A and 2B sandwiching the core layer 2C, similarly to the interlayer film 2 illustrated in FIG. 1. When fabricating into the laminated glass 10, the interlayer film was designed such that the outer layer 2A was an internal outer layer and the outer layer 2B was an external outer layer.

It should be noted that PVB used for the core layer (hereinafter sometimes referred to as "soft PVB") had, with respect to all of the interlayer films 1 to 6 and the interlayer film cf1, the storage elastic modulus of $0.3 \times 10^6$ Pa under the condition (1) which was measured by the following method. Likewise, PVB used for the internal outer layer and the external outer layer (hereinafter sometimes referred to as "hard PVB") had, with respect to all of the interlayer films, the storage elastic modulus of $1.2 \times 10^8$ Pa under the condition (1) which was measured by the following method.

As the interlayer film 1, an interlayer film was fabricated in which hard PVB (350 μm)/soft PVB (150 μm)/hard PVB (350 μm) were in turn laminated, corresponding to the internal outer layer/the core layer/the external outer layer, respectively. The film thickness of each of the internal outer layer, the external outer layer, and the core layer was regulated by pressing with a hot press forming machine at the temperature of 150° C. for 300 seconds at a press pressure of 50 kg/cm².

As the interlayer films 2 to 6 and the interlayer film cf1, an interlayer film was fabricated in which the core layer made of soft PVB, of which thickness was shown in Table 1, was sandwiched by the internal outer layer and the external outer layer both made of two sheets of hard PVB, of which thickness was similarly shown in Table 1. The film thickness of each of the internal outer layer, the external outer layer, and the core layer was regulated similarly to the interlayer film 1.

Each of the interlayer films cf2 to cf4 is a single layer film, and made of a PVB film of which film thickness and the storage elastic modulus under the condition (1) measured by the following method are shown in Table 1.

(Evaluation of Interlayer Films)

The storage elastic modulus of the obtained interlayer films was evaluated by the following method.

<Storage Elastic Modulus G'>

For the above mentioned interlayer films, the storage elastic modulus G' was measured by the dynamic viscoelastic test measuring by the shearing method, using a Rheometer MCR 301 (brand name) manufactured by Anton Paar GmbH, under the condition at the frequency of 1 Hz and the temperature of 20° C. (i.e., the condition (1)). Table 1 shows results with the obtained storage elastic modulus being shown as the storage elastic modulus under the condition (1).

TABLE 1

| Abbreviation of Interlayer Film | Thickness [μm] | | | | Storage Elastic Modulus G' under Condition (1) [×10⁶ Pa] |
|---|---|---|---|---|---|
| | Internal Outer Layer (PVB) | Core Layer (PVB) | External Outer Layer (PVB) | Total | |
| Interlayer Film 1 | 350 | 150 | 350 | 850 | 5.0 |
| Interlayer Film 2 | 325 | 200 | 350 | 875 | 3.5 |
| Interlayer Film 3 | 300 | 250 | 350 | 900 | 2.0 |
| Interlayer Film 4 | 400 | 230 | 400 | 1030 | 80 |
| Interlayer Film 5 | 420 | 230 | 420 | 1070 | 90 |
| Interlayer Film 6 | 450 | 230 | 450 | 1130 | 130 |
| Interlayer Film cf1 | 330 | 100 | 330 | 760 | 1.6 |
| Interlayer Film cf2 | 760 (Single Layer; PVB) | | | 760 | 2.8 |
| Interlayer Film cf3 | 800 (Single Layer; PVB) | | | 800 | 140 |
| Interlayer Film cf4 | 760 (Single Layer; PVB) | | | 760 | 120 |

As apparent from the Table 1, the interlayer films 1 to 6 are confirmed to have the storage elastic modulus G' equal to or greater than $2.0 \times 10^6$ Pa, respectively. Also, as shown in the following Table 2, each of the laminated glasses in which the interlayer film 1 to 6 are sandwiched between a pair of soda lime glass plates with the thickness of 1.8 mm respectively, has the loss factor equal to or greater than 0.2 at one or more resonance points at the frequency of 3 to 6 KHz and the temperature of 20° C. On the other hand, the interlayer films cf1 to cf4 are interlayer films that do not satisfy either of the above requirements.

Examples 1 to 10

Using the above prepared interlayer films 1 to 6 and interlayer films cf1 to cf4, the laminated glass having configurations shown in Table 2 were fabricated. An inner plate of the glass plate means a glass plate located interior when being fabricated into the laminated glass, and an outer plate means a glass plate located exterior when being fabricated into the laminated glass. Corresponding to the laminated glass 10 shown in FIG. 1, the glass plates were combined with the above mentioned interlayer films with the inner plate being the glass plate 1A and the outer plate being the glass plate 1B.

In order to obtain a similar configuration to the laminated glass 10 shown in FIG. 1, the glass plate 1A, the interlayer film 2, and the glass plate 1B were laminated, and thus obtained laminated body was put into a vacuum bag to undergo a preliminary compression bonding at the temperature of 110° C. while deaerating under a reduced pressure equal to or less than −60 kPa at an absolute pressure. Subsequently, the vacuum bag containing the laminated body underwent a primary compression bonding under a condition at the temperature of 140° C. and a pressure of 1.3 MPa so that a laminated glass was obtained. It should be noted that all used glass plates were soda lime glass.

(Evaluation of Laminated Glass)

The sound insulating property and the strength of the laminated glass obtained in Examples 1 to 10 were measured, respectively, as will be described below.

<Sound Insulating Property>

For the laminated glass, which were obtained as above, the loss factors at the frequency of 3 to 6 KHz and the temperature of 20° C. were measured using the central exciting method measuring system (MA-5500, DS-2000 (brand name)) manufactured by Ono Sokki Co. Ltd. Maximum values of the loss factors at the resonance points within the above frequency are shown in Table 2 with the obtained maximum value of the loss factor being a maximum value of the loss factor under a condition (2).

<Sound Insulating Property (SAE Standard)>

In compliance with SAE J1400, the sound transmission loss (STL) of the laminated glass at the temperature of 20° C. was measured. Results thereof is shown in Table 2.

<Three Point Bend Rigidity>

Using a compression tensile test machine, the strength (load) at a time of breakage was measured by placing a test piece with the length of 300 mm and the width of 100 mm on a supporting table with a span (distance between fulcrums) of 200 mm, and lowering an indenter at a loading speed of 1 mm per minute under a condition at the temperature of 23° C. Here, a load when lowering by 1 mm (N) are assumed to be the rigidity and denoted as N/mm. Results thereof is shown in Table 2.

TABLE 2

| Examples | Glass Plate Inner Plate Thickness [mm] | Glass Plate Outer Plate Thickness [mm] | Interlayer Film Type | Interlayer Film Thickness [mm] | Laminated Glass Maximum Value of Loss Factor under Condition (2) | Laminated Glass Three Point Bend Rigidity [N/mm] | STL [dB] |
|---|---|---|---|---|---|---|---|
| 1 | 1.8 | 1.8 | Interlayer Film 1 | 0.85 | 0.27 | 140 | 34.8 |
| 2 | 1.8 | 1.8 | Interlayer Film 2 | 0.88 | 0.35 | 120 | 36.1 |
| 3 | 1.8 | 1.8 | Interlayer Film 3 | 0.90 | 0.42 | 100 | 38.3 |
| 4 | 1.8 | 1.8 | Interlayer Film 4 | 1.03 | 0.29 | 140 | 36.0 |
| 5 | 1.8 | 1.8 | Interlayer Film 5 | 1.07 | 0.24 | 160 | 32.6 |
| 6 | 1.8 | 1.8 | Interlayer Film 6 | 1.13 | 0.22 | 180 | 28.2 |
| 7 | 1.8 | 1.8 | Interlayer Film cf1 | 0.76 | 0.44 | 80 | 40.6 |
| 8 | 1.8 | 1.8 | Interlayer Film cf2 | 0.76 | 0.10 | 100 | 17.5 |
| 9 | 1.8 | 1.8 | Interlayer Film cf3 | 0.80 | 0.02 | 180 | 20.7 |
| 10 | 1.8 | 1.8 | Interlayer Film cf4 | 0.76 | 0.01 | 150 | 20.9 |

It is apparent from the Table 2 that the laminated glass according to the Experimental Examples has a superior sound insulating property and also a superior mechanical strength even if the thickness of the glass plate are made thinner and lightweight.

What is claimed is:

1. A laminated glass, comprising:
   a pair of glass plates each having a plate thickness of 0.3 mm to 1.8 mm; and
   an interlayer film provided between the glass plates and having a storage elastic modulus G' equal to or greater than $2.0 \times 10^6$ Pa at a frequency of 1 Hz and temperature of 20° C.,
   wherein the laminated glass has a loss factor equal to or greater than 0.2 at one or more resonance points at the frequency of 3 to 6 KHz and the temperature of 20° C.
   the interlayer film of the laminated glass is composed of three layer including a core layer and a pair of outer layers configured to sandwich the core layer,
   a storage elastic modulus G's of the outer layers are equal to or greater than $5.0 \times 10^6$ Pa and equal to or less than $1.3 \times 10^8$ Pa at the frequency of 1 Hz and the temperature of 20° C.,
   a storage elastic modulus G' of the core layer is equal to or greater than $1.0 \times 10^4$ Pa and equal to or less than $1.0 \times 10^7$ Pa at the frequency of 1 Hz and the temperature of 20° C.,
   the core layer has a smaller storage elastic modulus G' at the frequency of 1 Hz and the temperature of 20° C. compared to the pair of the outer layers, and,
   a layer thickness of the core layer is 0.05 mm to 0.30 mm.

2. The laminated glass according to claim 1, wherein the pair of glass plates have different thickness each other.

3. The laminated glass according to claim 1, wherein the core layer has a glass transition point within a range of 0° C. to 20° C.

4. The laminated glass according to claim 1, wherein the laminated glass is usable as a side glass, a roof glass, or a rear glass for a vehicle.

5. The laminated glass according to claim 1, wherein the laminated glass has a rigidity measured by a three point bend test is equal to or greater than 100 N/mm.

6. The laminated glass according to claim 1, wherein the laminated glass has a sound transmission loss equal to or greater than 25 dB measured at the temperature of 20° C. in compliance with SAE J1400.

7. The laminated glass according to claim 1, wherein a proportional value of the storage elastic modulus G's of the outer layers with respect to the storage elastic modulus G' of the core layer is 100 to 3000.

8. The laminated glass according to claim 1, wherein the laminated glass is usable as a side glass for a vehicle.

* * * * *